United States Patent
Ralph et al.

(10) Patent No.: US 10,379,333 B2
(45) Date of Patent: Aug. 13, 2019

(54) IMAGING APPARATUS AND METHODS

(71) Applicant: Southern Research Institute, Birmingham, AL (US)

(72) Inventors: William Carter Ralph, Birmingham, AL (US); Kevin Connolly, Birmingham, AL (US)

(73) Assignee: Southern Research Institute, Birmingham, AL (US)

( * ) Notice: Subject to any disclaimer, the term of this patent is extended or adjusted under 35 U.S.C. 154(b) by 236 days.

(21) Appl. No.: 15/205,547

(22) Filed: Jul. 8, 2016

(65) Prior Publication Data
US 2018/0011304 A1    Jan. 11, 2018

(51) Int. Cl.
| | | |
|---|---|---|
| H04N 7/18 | (2006.01) | |
| G02B 21/30 | (2006.01) | |
| G02B 21/00 | (2006.01) | |
| G02B 21/36 | (2006.01) | |
| G02B 21/34 | (2006.01) | |

(52) U.S. Cl.
CPC ......... *G02B 21/30* (2013.01); *G02B 21/0016* (2013.01); *G02B 21/34* (2013.01); *G02B 21/367* (2013.01); *H04N 7/18* (2013.01)

(58) Field of Classification Search
CPC .. G02B 21/30; G02B 21/0016; G02B 21/367; G02B 7/18
USPC ....................................................... 348/126
See application file for complete search history.

(56) References Cited

U.S. PATENT DOCUMENTS

| | | | |
|---|---|---|---|
| 5,214,277 A | 5/1993 | Drennen, III | |
| 5,329,686 A | 7/1994 | Kildal et al. | |
| 5,552,321 A * | 9/1996 | Focht | B01L 7/00 359/395 |
| 5,717,190 A * | 2/1998 | Inoue | G02B 21/30 219/522 |
| 6,413,895 B1 * | 7/2002 | Merkel | B01D 39/2068 264/177.12 |
| 6,659,640 B2 | 12/2003 | Ruffa | |
| 8,873,141 B2 * | 10/2014 | Qian | G02B 21/22 359/398 |
| 9,322,784 B2 * | 4/2016 | Grassl | G01N 21/253 |
| 2005/0248836 A1 | 11/2005 | Tsuchiya | |

(Continued)

OTHER PUBLICATIONS

International Search Report in corresponding PCT Application No. PCT/US17/41390, dated Sep. 26, 2017.

*Primary Examiner* — Trang U Tran
(74) *Attorney, Agent, or Firm* — Edell, Shapiro & Finnan, LLC

(57) ABSTRACT

An apparatus for imaging a feature within a specimen is provided. According to one implementation the apparatus includes a substrate that is configured to support a specimen on an upper surface of the substrate so that the specimen resides over a hole that extends through the substrate. A heater is located vertically above the upper surface of the substrate. The heater is configured to heat the specimen when the specimen is supported on the substrate. An imaging device is located vertically below the lower surface of the substrate. The imaging device has an unobstructed line of sight to and through the hole in the substrate. The lower surface of the substrate is supported on a heat insulating platform in a manner that permits air to flow between the heat insulating platform and the lower surface of the substrate.

23 Claims, 7 Drawing Sheets

(56) References Cited

U.S. PATENT DOCUMENTS

| | | |
|---|---|---|
| 2009/0141345 A1 | 6/2009 | Tsuchiya |
| 2009/0143003 A1 | 6/2009 | Roesch et al. |
| 2010/0009839 A1* | 1/2010 | Can .................... C04B 35/117 501/87 |
| 2012/0064564 A1 | 3/2012 | Grassl et al. |
| 2012/0067145 A1* | 3/2012 | Suzuki ................ C04B 35/583 73/866.5 |

* cited by examiner

IMAGING APPARATUS AND METHODS

FIELD OF THE INVENTION

The present invention relates to apparatus and methods that facilitate a taking of multiple images of a feature over time at different temperatures.

BACKGROUND

Many devices comprise multiple interconnected parts that have different coefficients of thermal expansion. When such parts are subject to a change in temperature stresses occur as a result of the different parts expanding or contracting at different rates. This can cause some parts to be excessively strained to the point of cracking, breaking or otherwise being deformed in a manner that adversely impacts the part's ability to function as intended.

As an example, FIG. 1A illustrates a flip chip 1, also known as controlled collapse chip connection or its acronym, C4, whereby an integrated circuit die 2 is electrically connected to the interconnecting substrate 3 by solder bumps 4. The solder bumps 4 electrically connect the die 2 to the substrate 3 through metallic pads 5 and 6. The solder bumps 4 also assist in mechanically bonding the die 2 to the substrate 3. The severe thermal expansion mismatch between the silicon die 2 and the substrate 3 will introduce significant thermal stresses in the package, especially in the small solder bumps 4. An underfill 7 is typically provided to fill the space between the die 2 and the substrate 3 to assist in mechanically bonding the parts together and to reduce the thermal stresses in the solder bumps 4. The underfill is typically a polymer material (e.g. filled epoxy).

During the development of electrical and mechanical devices it is customary to conduct testing on the devices to ensure their electrical and/or mechanical integrity is maintained over a host of expected operating conditions. For example, during the development of a flip chip the device may be subjected to cyclic changes in temperature over a range in which the device is expected to operate to determine if the solder bumps 4 sufficiently maintain their structure to reliably provide an electrical interconnect between the die 2 and the substrate 3. Such testing is vital for devices over a broad range of technologies.

SUMMARY OF THE DISCLOSURE

According to one implementation an apparatus for imaging a specimen is provided that comprises: a substrate comprising an upper surface, a lower surface and a hole extending between and through the upper and lower surfaces, the upper surface having a zone that at least partially circumscribes the hole that is configured to support the specimen; a heater located vertically above the upper surface of the substrate that is configured to heat the specimen when the specimen is supported on the substrate; an optical microscope comprising a lens, the optical microscope located vertically below the lower surface of the substrate, the lens having an unobstructed line of sight to and through the hole in the substrate; and a heat insulating platform including an upper surface, a lower surface and a through opening extending through the upper and lower surfaces, the lower surface of the substrate being supported on the heat insulating platform in a manner that permits air to flow between the heat insulating platform and the substrate, the through opening providing the lens of the optical microscope with the unobstructed line of sight.

According to some implementations the apparatus comprises a housing located vertically above the upper surface of the substrate, the heater being located inside the housing with the housing surrounding the zone of the upper surface of the substrate.

According to some implementations the chamber has a cover disposed on an upper end of the chamber that encloses the upper end of the chamber. The cover may include an air vent that permits air to flow out of the chamber to the ambient environment in which the apparatus is located. According to one implementation the air vent is adjustable to modulate air flow out of the chamber.

According to some implementations the zone is at least partially surrounded by a recess in the upper surface of the substrate.

According to some implementations the lower surface of the substrate is supported on the heat insulating platform in a manner that permits air to naturally flow between the heat insulating platform and substrate in a manner to maintain the average air temperature between the lens and the lower surface of the substrate substantially constant when the heater dissipates heat.

According to some implementations the apparatus comprises a fan position vertically below the lower surface of the heat insulating platform, the fan configured to induce a forced air flow in an area between the lens and the lower surface of the substrate.

According to some implementations the substrate is made of a material having a low coefficient of thermal expansion. According to some implementations the material has a coefficient of thermal expansion that is less than or equal to $2 \times 10^{-6}/° C$.

According to one implementation a method of imaging a feature located within a specimen is provided that comprises A method of imaging a feature located within a specimen, the method comprising: placing the specimen on the upper surface of a substrate, the substrate having a lower surface and a hole extending between and through the upper and lower surfaces of the substrate, the specimen being positioned on the substrate so that the feature resides over the hole; positioning an optical microscope having a lens vertically below the lower surface of the substrate so that an unobstructed line of sight exists between the lens and the feature; and heating the specimen to different temperatures and obtaining an image of the feature with the optical microscope at the different temperatures.

According to one implementation the specimen has a side edge and when the specimen is positioned on the upper surface of the substrate the side edge resides over a recess in the upper surface of the substrate.

According to one implementation the average air temperature between the lens of the optical microscope and the lower surface of the substrate is maintained substantially constant while the specimen is being heated.

These and other implementations are more fully described in the detailed description and the accompanying drawings.

DETAILED DESCRIPTION

Figure 2:
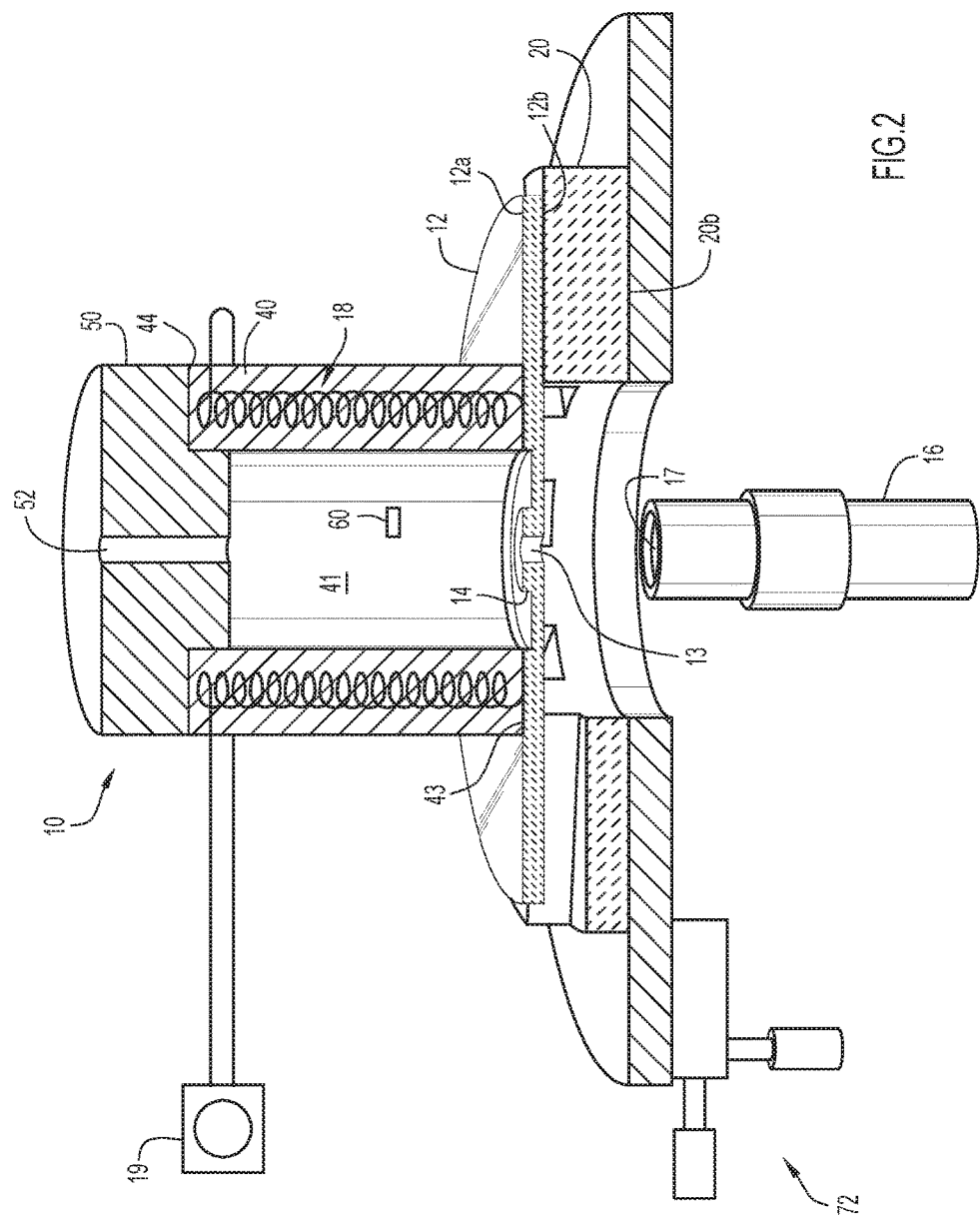
FIG. 2 is an isometric cross-sectional side view of an apparatus for imaging a specimen according to one implementation.

FIG. 2 is an isometric cross-sectional side view of an apparatus 10 for imaging a specimen according to one implementation. The apparatus 10 includes a low thermal expansion substrate 12 having an upper surface 12a and a lower surface 12b. The substrate 12 has a through hole 13 that extends between and through the upper and lower surfaces. A zone 14 surrounding the hole 13 is adapted to support a specimen to be imaged An imaging device 16 is located vertically below the lower surface 12b of the substrate 12 so that the imaging device has an unobstructed line of site to and through the hole 13 in the substrate 12. According to some implementations the imaging device is an optical microscope having a lens 17, the lens being located vertically below the lower surface 12b of the substrate 12 so that the lens 17 has an unobstructed line of site to and through the hole 13 in the substrate 12.

A heater 18 is located vertically above the upper surface 12a of the substrate 12. The heater 18 is configured to impart heat to the zone 14 of the substrate 12 so as to heat a specimen supported on the zone when the apparatus is in use. The heater may be, for example, a resistive heater or an infrared heater. As will be discussed in more detail below, in use, a specimen is supported on the upper surface 12a of the substrate 12 so that a feature of interest located in the specimen is positioned over the hole 13 so that an unobstructed line of site is provided between the lens 17 and the feature.

Figure 5:
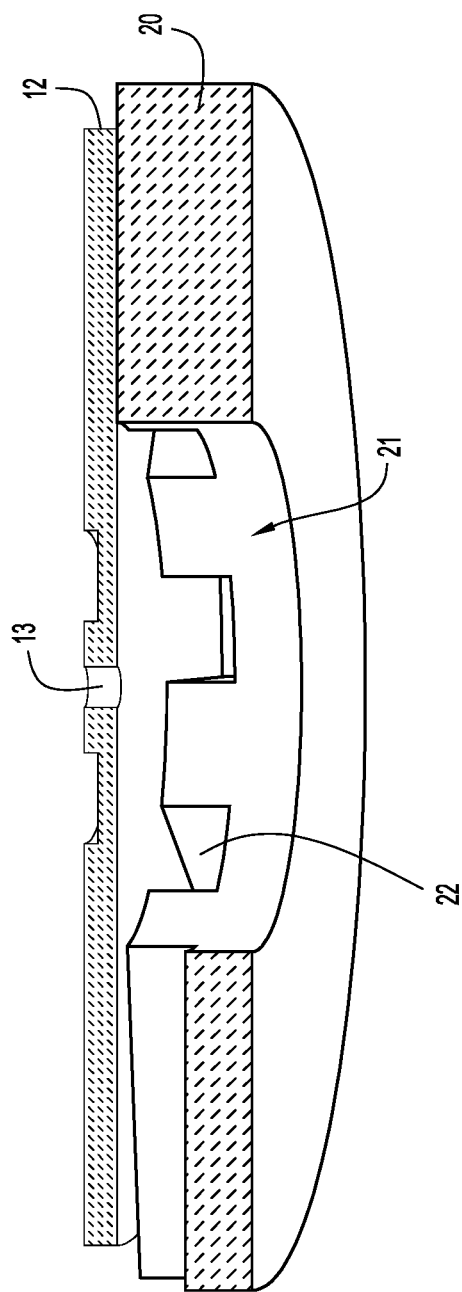
FIG. 5 shows a low thermal expansion substrate supported on a heat insulating platform according to one implementation.
Figure 6A:
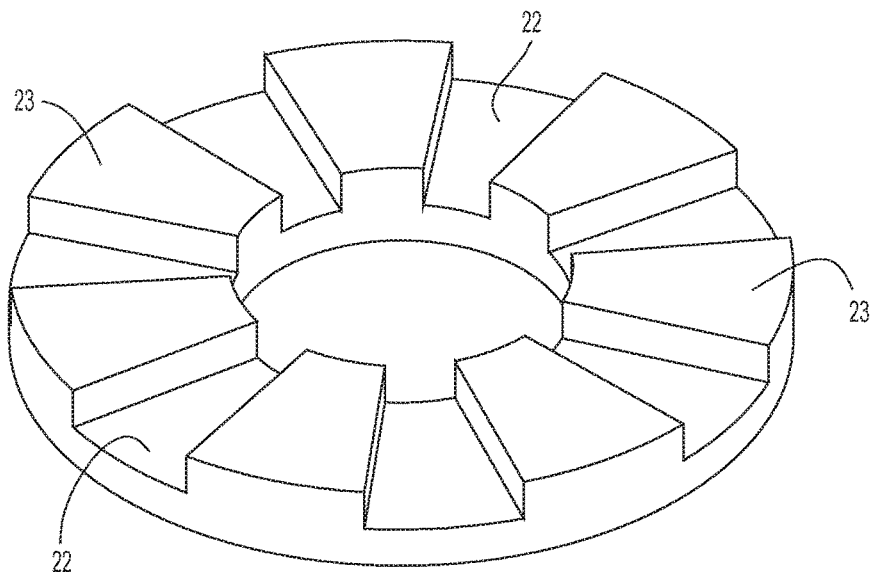
FIG. 6A illustrates a heat insulating platform according to one implementation.
Figure 6B:
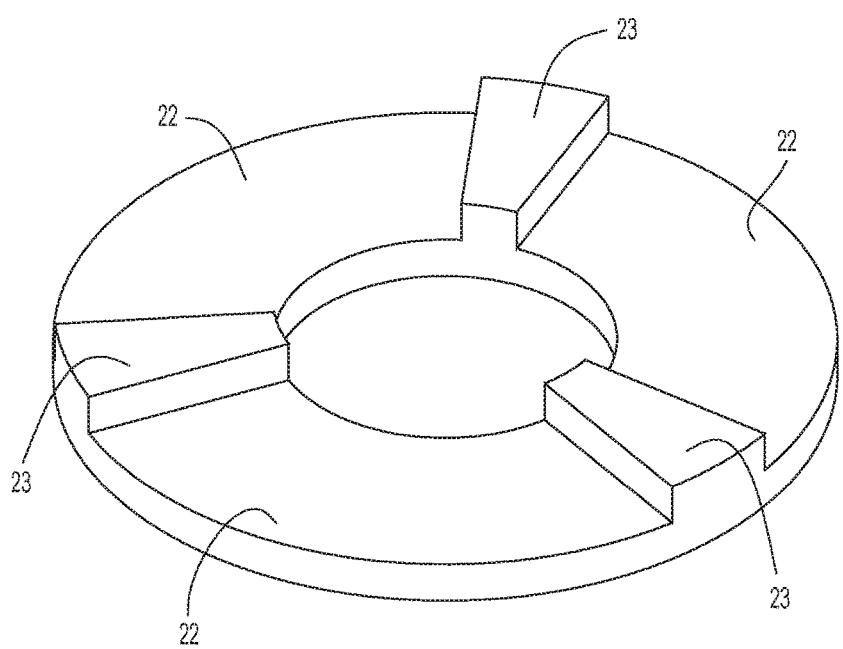
FIG. 6B illustrates a heat insulating platform according to another implementation.

According to one implementation the low thermal expansion substrate 12 is supported on a heat insulating platform 20 as shown in FIGS. 2 and 5. The heat insulating platform 20 is constructed of a heat insulating material to minimize the transfer of heat from the heater 18 to the region between the lens 17 and the lower surface 12b of the substrate. The heat insulating platform 20 has a central through opening 21 that provides the lens 17 with the unobstructed line of site to and through the hole 13 in the substrate 12. The substrate 12 is supported on the heat insulating platform 20 in a manner that permits air to flow between the heat insulating platform and the substrate. In the implementation of FIGS. 2, 5, 6A and 6B, radially oriented through passages 22 are provided about the perimeter of the heat insulating platform 20 to enable air to circulate up through opening 21 and out the passages 22. In the implementation of FIG. 6A the low thermal expansion substrate 12 rests on six supports 23 of the heat insulating platform 20 with there being six radially oriented through passages 22. In the implementation of FIG. 6B the low thermal expansion substrate 12 rests on three supports 23 of the heat insulating platform 20 with there being three radially oriented through passages 22.

According to some implementations the lower surface of the substrate is supported on the heat insulating platform in a manner that permits air to naturally flow between the heat insulating platform 20 and substrate 12 in a manner to maintain the average air temperature between the lens 17 and the lower surface 12b of the substrate 12 substantially constant when the heater 18 is operated to heat a specimen located on the upper surface 12a of the substrate 12. According to other implementations the natural air flow causes the average air temperature between the lens 17 and the lower surface 12b to be maintained at no more than 10° F., and preferably no more than 5° F., of the average air temperature of the ambient environment while the heater 18 is operated to heat the specimen.

According to other implementations the apparatus further includes at least one fan (not shown in the figures) that is positioned vertically below the lower surface 20b of the heat insulating platform 20. In operation the fan forces air to flow into the area between the lens 17 and the lower surface 12b of the substrate 12 to assist in maintaining the air temperature in the area between the lens 17 and the lower surface 12b of the substrate 12 substantially constant when the heater 18 is operated to heat the specimen. According to some implementations the forced air flow causes the average air temperature between the lens 17 and the lower surface 12b to be maintained at no more than 10° F., and preferably no more than 5° F., of the average air temperature of the ambient environment while the heater 18 is operated to heat the specimen, the ambient environment being an enclosure, such as a room, in which the apparatus 10 is located. In some instances the apparatus 10 may reside in a compartment, chamber, and the like located within a room. In such instances the ambient environment is the volumetric space inside such enclosure.

According to one implementation the low thermal expansion substrate 12 comprises quartz having a coefficient of thermal expansion of about $6 \times 10^{-7}/°$ C. The substrate 12 may comprise other materials, such as ceramics (e.g. ZERO-DUR®), fiberglass composites, fused silica and metal alloys tuned to have low coefficients of thermal expansion at certain temperatures, etc. As used herein, "a low coefficient of thermal expansion" means a coefficient of thermal expansion less than or equal to $2 \times 10^{-6}/°$ C.

Figure 3A:
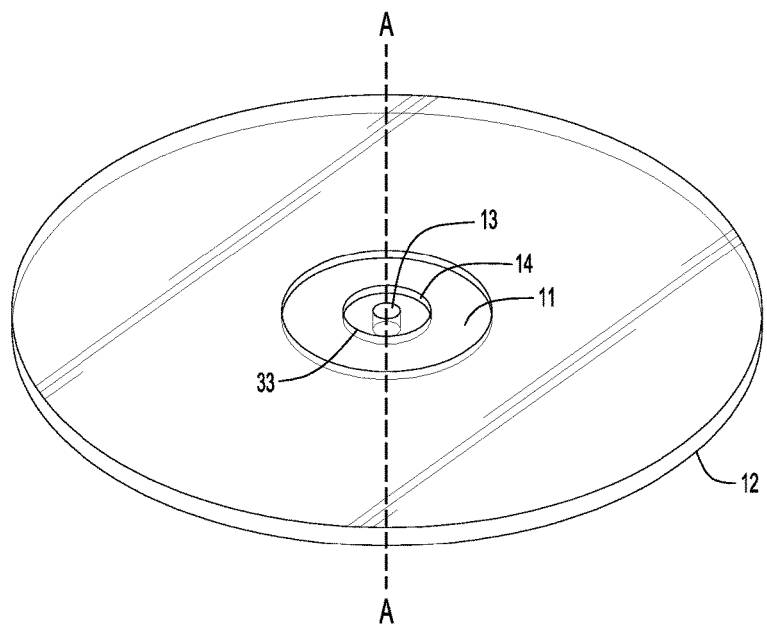
FIG. 3A is a low thermal expansion substrate according to one implementation.
Figure 3B:
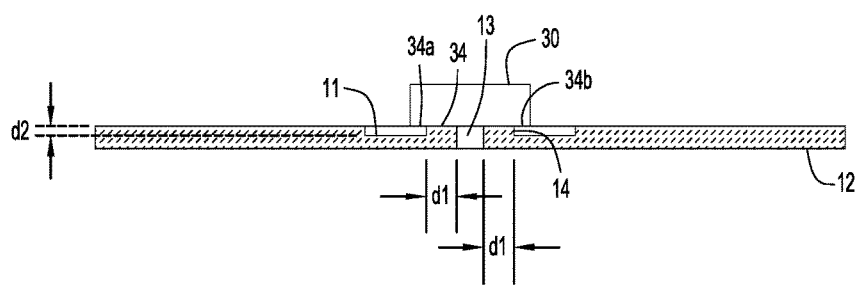
FIG. 3B shows a flip chip device positioned on the low thermal expansion substrate of FIG. 2A.

According to one implementation the low thermal expansion substrate 12 has a diameter of about 4.0 inches and a thickness of about 0.5 inches with the hole 13 having a diameter of about 0.25 inches. As shown in FIGS. 3A and 3B, according to some implementations the specimen support zone 14 is at least partially surrounded by a recess 11 formed in the upper surface 12a of the substrate 12. In the implementation illustrated in FIGS. 3A and 3B, the recess 11 is circular and completely circumscribes the hole 13. FIG. 3B shows a specimen 30 located on the support zone 14, with at least a portion of the bottom edge 34 of the specimen residing over the hole 13. As will be described in more detail below, the feature to be imaged is located exposed on the portion of the bottom edge 34 of the specimen located over the hole 13. As shown in FIG. 3B, the substrate 12 is constructed so that portions 34a and 34b of the bottom edge 34 of the specimen 30 are located over the recess 11.

During a heating of the specimen 30, in some instances the outer portions 34a and 34b of the bottom edge 34 may distort, bending in a downward direction. Absent the recess 11 in the upper surface 12a of the substrate 12, this bending would result in the central portion of the bottom edge 34 to be raised upward and away from the hole 13. This would adversely affect the optical microscope's ability to obtain quality images since the distance between the feature to be imaged and the lens 17 of the optical microscope 18 would change as the temperature of the specimen 30 changes. The recess 11 provides a space below the bottom edge 34 of the specimen 30 to receive the outer portions 34a and 34b as the specimen is heated. This advantageously prevents the outer portions 34a and 34b from contacting the upper surface 12a of the substrate 12 during the heating process. In the implementation of FIGS. 3A and 3B, the use of a recess that completely surrounds the support zone 14 allows for greater flexibility in the placement of the specimen 30 on the substrate 12.

Figure 4A:
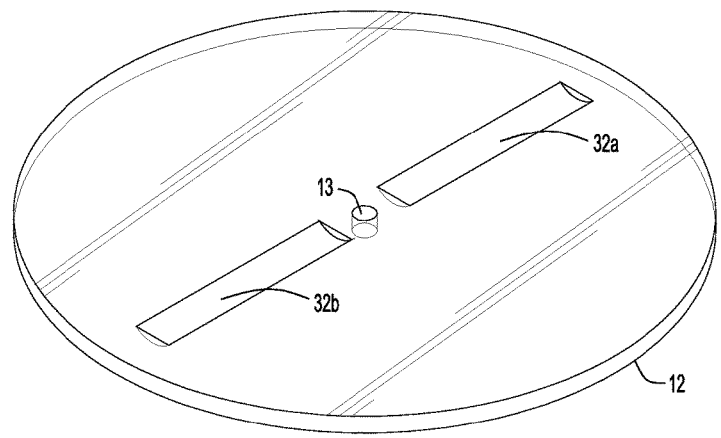
FIG. 4A is a low thermal expansion substrate according to another implementation.
Figure 4B:
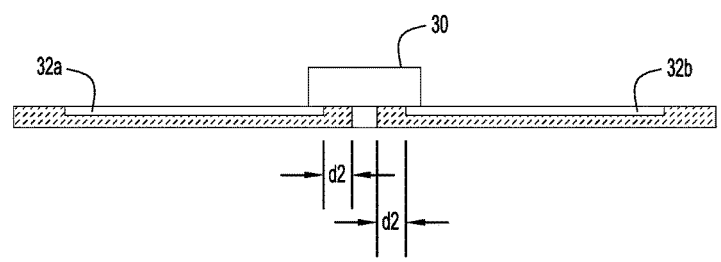
FIG. 4B shows a flip chip device positioned on the low thermal expansion substrate of FIG. 4A.

It is appreciated that the recess may take any of a variety of forms. It is also appreciated that more than one recess may be provided. For example, in the implementation of FIGS. 4A and 4B two elongate, radially extending recesses 32a and 32b are formed in the upper surface 12a of the substrate 12. In such an implementation, as shown in FIG. 4B, the outer portions 34a and 34b of the bottom edge 14 of the specimen 30 respectively reside over recesses 32a and 32b.

The relative sizes and shapes of the support zone 14 and the one or more recesses that at least partially surround it may vary depending on the size and shape of the specimen to be supported on the substrate 12. According to some implementations, the radial distance d1 between the outer perimeter of the hole 13 and an inner edge of the recess is between 0.1 inches to 0.5 inches. Further, according to some implementations the one or more recesses may each have a depth of between about 0.1 inches to about 0.2 inches.

Turning again to FIG. 2, according to some implementations the apparatus 10 also includes a housing 40 located vertically above the upper surface 12a of the substrate 12. The housing may partially or fully surround that portion of the upper surface 12a of the substrate 12 that is designated to support a specimen to be imaged. According to some implementations the heater 18 is located inside a chamber 41 formed by the housing 40. In the implementation of FIG. 2, the heater 18 is a resistive heater embedded or otherwise supported by an inner wall of the housing 40. According to some implementations a bottom end 43 of the housing 40 is supported directly on the upper surface 12a of the substrate 12 as shown in FIG. 2.

According to some implementations the housing has a cover 50 disposed on an upper end 44 of the housing 40 that encloses the chamber 41. The cover 50 may include an air vent 52 that permits hot air to flow out of the housing 40 to the ambient environment while the specimen is being heated. According to some implementations the air vent 52 is adjustable to allow for the modulation of hot air flow out of the housing 40.

The temperature inside the chamber 41 is regulated by the use of a temperature controller 19. The temperature inside the chamber 41 may be maintained at a desired temperature, or cycled between temperatures, by the use of one or more temperature sensors 60 located in the chamber 41 that communicate with the temperature controller 19.

According to some implementations either one or both of the lateral position and axial position of the optical microscope 16 is fixed. That is, the microscope 16 does not move from side to side in relation to the substrate 12 and/or is not axially movable towards or away from the substrate 12. For this reason, according to some implementations the substrate 12, or the heat insulating platform 20 that supports the substrate 12, may rest on or otherwise be fixed to an adjustment stage 70 that is adjustable in one or more of the x, y and z coordinate axes. According to one implementation, as shown in FIG. 2, the adjustment stage 70 is equipped with an x, y, z micrometer system 72 that is capable of precisely changing the position of the adjustment stage with a high degree of accuracy.

According to some implementations either one or both of the lateral position and axial position of the optical microscope 16 is adjustable. In such implementations the adjustment stage 70 may be disposed with altogether or may be used in conjunction with the movable microscope to place the lens 17 of the microscope 16 in proper alignment with the feature to be imaged located over the hole 13 in the substrate 12.

Figure 1A:
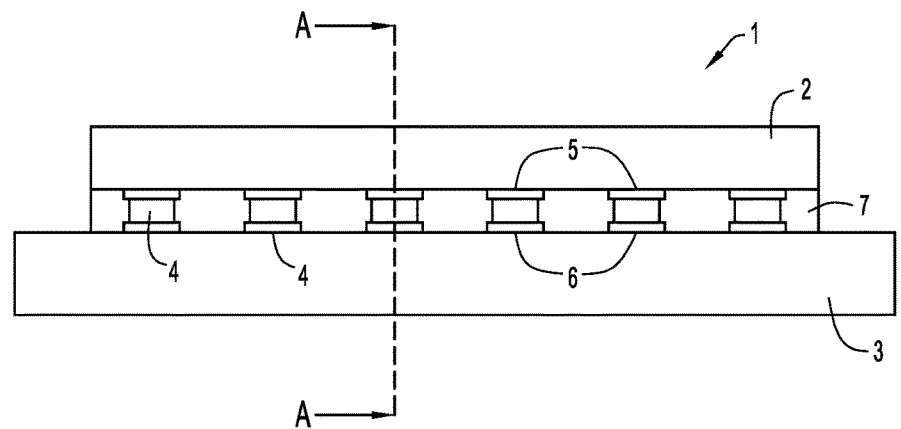
FIG. 1A is a cross-section side view of a flip chip device.
Figure 1B:
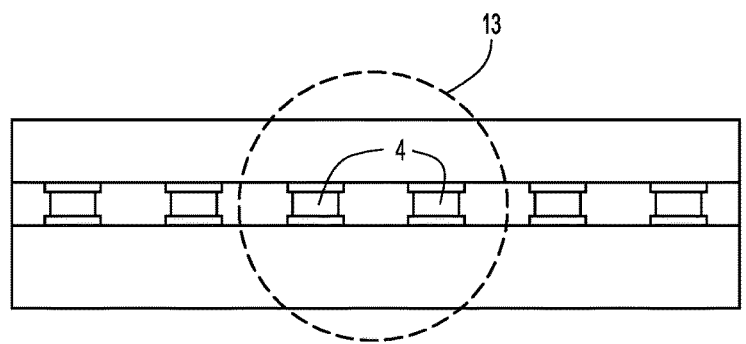
FIG. 1B is a cross-section view of the flip chip device of FIG. 1A along lines A-A.
Figure 7:
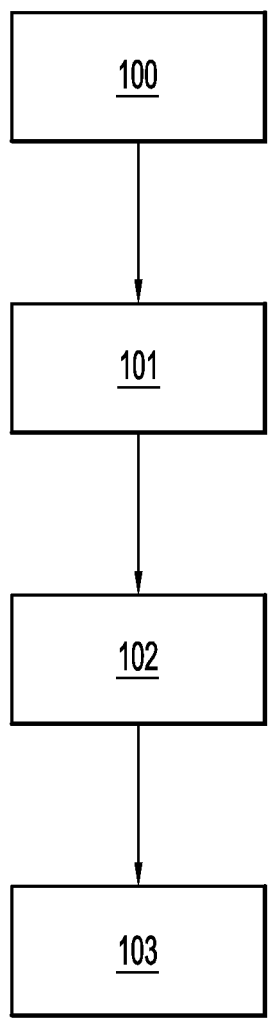
FIG. 7 is a flow chart of a method for imaging a feature according to one implementation.

A method of imaging a feature located within a specimen may be achieved by placing the specimen 30 on the upper surface 12 of the low thermal expansion substrate 12 so that the feature resides over the hole 13 (Step 100, FIG. 7). As discussed above, the specimen 30 may comprise a flip chip device 1 like that illustrated in FIG. 1A, with the feature to imaged being one or more of the solder bumps 4. In practice, the flip chip is cut, for example, along its width so that at least a portion of one or more of the solder bumps 4 resides at the bottom edge 34 of the specimen 30 after the flip chip is cut. In the example of FIG. 1B the feature comprises two solder bumps 4 residing adjacent one another. After the flip chip is cut, the bottom edge is typically polished to obtain a smooth and flat surface. The specimen 30 is then placed on the upper surface 12a of the substrate 12 so that the solder bumps of interest reside over the hole 13 in the substrate as illustrated in FIG. 1B.

With the specimen 30 properly positioned on the substrate 12, the apparatus is adjusted to place the lens 1 vertically below the lower surface 12b of the substrate 12 so that an unobstructed line of sight exists between the lens 17 and the solder bumps 4 (Step 101, FIG. 7). As explained above, according to differing implementations this can be achieved by imparting movement to the substrate 12 (e.g., by use of an adjustment stage as described above), by imparting movement to the optical microscope 16, or by imparting movement to both the substrate 12 and the optical microscope 16. When the lens 17 of the microscope 16 and the solder bumps 4 are properly aligned the flip chip 1 is heated to different temperatures by use of the heater 18 while obtaining images of the solder bumps 4 with the optical microscope 16 at the different temperatures (Step 102, FIG. 7). By use of digital image correlation software, a strain response of the solder bumps 4 may then by determined using the images obtained by the optical microscope (Step 103, FIG. 7).

As noted above, according to some implementations the average air temperature between the lens 17 of the optical microscope 16 and the lower surface of the substrate 12b is maintained substantially constant while the specimen is being heated. This may be accomplished via a natural flow of air or forced air as explained above.

The placement of the optical microscope 18 below the lower surface 12b of the substrate 12 according to the various implementations described above enables the microscope to obtain images without distortions caused by air temperature gradients existing between the lens 17 and the feature to be imaged that would otherwise exists if the optical microscope 18 was positioned above the top surface 12a of the substrate 12 looking down on the feature to be imaged.

While the invention has been illustrated and described in connection with certain implementations, it is not intended to be limited to the details shown since various modifications may be made without departing in any way from the spirit of the present invention. The implementations described were chosen in order to best explain the principles of the invention and are in no way intended to be limiting.

What is claimed is:

1. An apparatus for use in imaging a specimen, the apparatus comprising:
   a substrate comprising an upper surface, a lower surface and a hole extending between and through the upper and lower surfaces, the upper surface having a zone that at least partially circumscribes the hole that is configured to support the specimen over the hole, the zone is at least partially surrounded by a recess in the upper surface of the substrate; and
   a heat insulating platform including an upper surface, a lower surface and a through opening extending through the upper and lower surfaces, at least a portion of the lower surface of the substrate being supported on the heat insulating platform in a manner that permits air to flow between the heat insulating platform and the substrate, the through opening providing an unobstructed line of sight to and through the hole in the substrate.

2. The apparatus according to claim 1, further comprising a heater located vertically above the upper surface of the substrate that is configured to heat the specimen when the specimen is supported on the substrate.

3. The apparatus according to claim 1, further comprising a heater located vertically above the upper surface of the substrate that is configured to heat the specimen when the specimen is supported on the substrate.

4. The apparatus according to claim 1, further comprising an imaging device located vertically below the lower surface of the substrate, the imaging device having an unobstructed line of sight to and through the hole in the substrate.

5. The apparatus according to claim 3, further comprising an imaging device located vertically below the lower surface of the substrate, the imaging device having an unobstructed line of sight to and through the hole in the substrate.

6. The apparatus according to claim 2, further comprising a housing located vertically above the upper surface of the substrate, the heater being located inside the housing with the housing surrounding the zone of the upper surface of the substrate.

7. The apparatus according to claim 6, wherein the housing has a cover disposed on an upper end of the housing that encloses the upper end of the housing.

8. The apparatus according to claim 7, wherein the cover comprises an air vent that permits air to flow out of the housing to the ambient environment.

9. The apparatus according to claim 8, wherein the air vent is adjustable to modulate air flow out of the housing.

10. The apparatus according to claim 6, wherein the housing has a lower end that is supported on the upper surface of the substrate.

11. The apparatus according to claim 1, wherein the zone is substantially planar.

12. The apparatus according to claim 1, wherein the recess is an elongate recess that extends radially outward from the zone.

13. The apparatus according to claim 5, wherein the lower surface of the substrate is supported on the heat insulating platform in a manner that permits air to naturally flow between the heat insulating platform and substrate in a manner to maintain the average air temperature between the imaging device and the lower surface of the substrate substantially constant when the heater dissipates heat.

14. The apparatus according to claim 1, wherein the substrate is made of a material having a low coefficient of thermal expansion.

15. The apparatus according to claim 14, wherein the material has a coefficient of thermal expansion that is less than or equal to $2\times10^{-6}/^\circ$ C.

16. The apparatus according to claim 1, wherein the substrate comprises quartz.

17. The apparatus according to claim 1, further comprising a fan position vertically below the lower surface of the heat insulating platform, the fan configured to induce a forced air flow in an area between the imaging device and the lower surface of the substrate.

18. The apparatus according to claim 1, wherein a radial distance between an outer perimeter of the hole and an inner edge of the recess is between 0.1 inches and 0.5 inches.

19. The apparatus according to claim 1, wherein the recess has a depth of between 0.1 inches and 0.2 inches.

20. A method of imaging a feature located within a specimen, the method comprising:
   placing the specimen on the upper surface of a substrate, the substrate having a lower surface and a hole extending between and through the upper and lower surfaces of the substrate, the specimen being positioned on the substrate so that the feature resides over the hole,
   positioning an imaging device vertically below the lower surface of the substrate so that an unobstructed line of sight exists between the imaging device and the feature
   heating the specimen to different temperatures and obtaining an image of the feature with the imaging device at the different temperatures; and
   maintaining an average air temperature between the imaging device and the lower surface of the substrate substantially constant while the specimen is being heated, the average air temperature between the imaging device and the lower surface of the substrate being maintained substantially constant by forcing an air flow in an area between the imaging device and the lower surface of the substrate.

21. The method according to claim 20, wherein the specimen has a bottom edge, when the specimen is positioned on the upper surface of the substrate at least a portion of the bottom edge resides suspended over a recess in the upper surface of the substrate.

22. The method according to claim 20, wherein the specimen has a bottom edge, the bottom edge having a central portion, a first end portion and a second end portion opposite the first end portion, the central portion being located between the first and second end portions, when the specimen is positioned on the upper surface of the substrate each of the first and second end portions of the bottom edge resides over a recess in the upper surface of the substrate.

23. The method according to claim 20, further comprising calculating a strain response of the feature using the images of the feature obtained by the imaging device at the different temperatures.

* * * * *